Patented Feb. 3, 1931

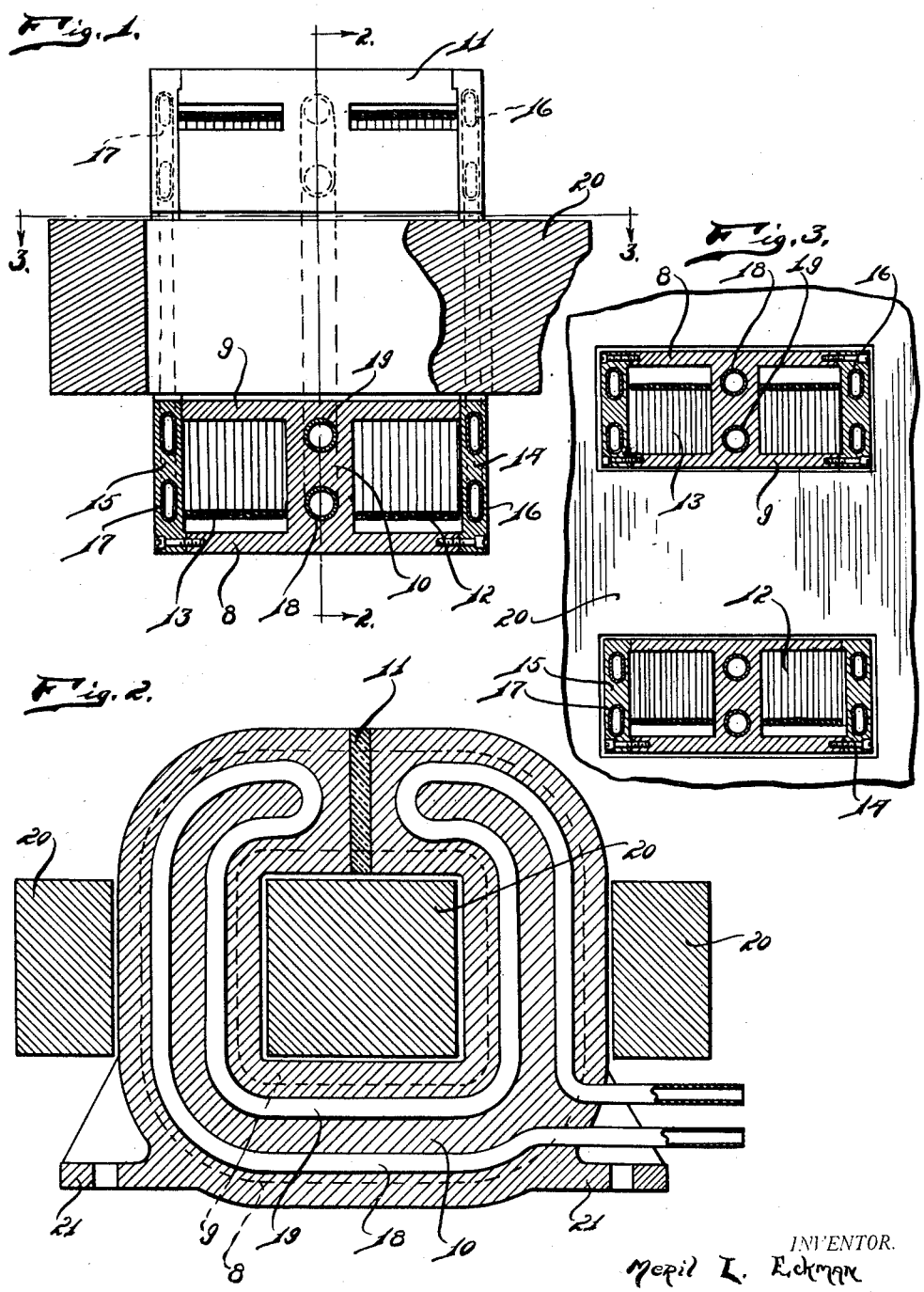

1,790,906

UNITED STATES PATENT OFFICE

MERIL L. ECKMAN, OF DETROIT, MICHIGAN

TRANSFORMER

Application filed June 3, 1929. Serial No. 367,896.

My invention relates to a new and useful improvement in a transformer and has for its object the provision of a transformer in which the primary coil will be entirely enclosed.

Another object of the invention is the provision of a transformer in which foreign material may be prevented from adhering to the coils and in which a greater life and longer surface and increased efficiency may result.

Another object of the invention is the provision of means for retaining the transformer in cooled condition.

Another object of the invention is the provision of a transformer which may be made light and compact and thus result in a closer approach to the work when used on a welding machine.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention with parts broken away and parts shown in section.

Fig. 2 is a sectional view taken on line 2—2 of Fig. 1.

Fig. 3 is a sectional view taken on line 3—3 of Fig. 1.

By completely enclosing the primary coil the adherence and abrasive action of all foreign matter drawn into or against the primary coil by the normal functioning of the transformer is eliminated and the continuous operation of the device made possible. The housing comprises the walls 8 and 9 which are joined by the central rib 10 to provide the necessary compartments for the reception of the primary coils 12 and 13, this housing being split and the split ends being separated by the layer of insulation 11. A closure 14 is provided for one end of the housing and a closure 15 for the other end, water conduits 16 and 17 being provided in the closures. As shown in Fig. 1, these closures are secured to the housing by screws and other suitable fastening means may be used if desired. The housing and the closures are preferably formed from cast metal such as copper, thus entirely enclosing the primary coils 12 and 13 of the transformer. Water conduits 18 and 19 are also provided in the housing through which water may be circulated so as to retain the transformer in a cool condition. The usual core 20 is provided in the transformer. The housing, as shown in Fig. 2, is also provided with lugs 21 affording means for use of screws or other suitable fastening means.

With a transformer constructed in this manner, the advantages sought for are obtained and an efficient operation of the device is assured. The housing, of course, forms the secondary of the transformer.

Having thus described my invention, what I claim as new and desire to secure by Letters Patent is:

1. In a transformer: a housing comprising inner and outer walls in spaced relation to each other; a rib extending centrally between and connecting to said walls to provide a space between said walls at opposite sides of said rib; a primary coil embracing said inner wall at each side of said rib; conduits formed in said rib for conducting fluid thereinto.

2. In a transformer: a housing comprising inner and outer walls in spaced relation to each other; a rib extending centrally between and connecting to said walls to provide a space between said walls at opposite sides of said rib; a primary coil embracing said inner wall at each side of said rib; conduits formed in said rib for conducting fluid thereinto; a closure mounted on each end of said housing; and conduits formed in each of said closures for conducting cooling fluid therethrough.

3. In a transformer: a housing comprising inner and outer walls in spaced relation; a central rib extending between and connecting said walls, said central rib having conduits formed therein; a primary coil embracing said inner wall and positioned at opposite sides of said rib; a closure mounted on each end of said walls enclosing the space between said walls, each of said walls having conduits formed therein for conducting cooling fluid there-through.

4. In a transformer: a housing comprising inner and outer walls in spaced relation; a central rib extending between and connecting said walls at their center, said walls being split at one side; a layer of insulation positioned in the split between the ends of said walls; and a closure mounted on each end of said walls.

In testimony whereof I have signed the foregoing specification.

MERIL L. ECKMAN.